United States Patent [19]

Hirschel

[11] Patent Number: 4,712,751
[45] Date of Patent: Dec. 15, 1987

[54] TAIL END STRUCTURE FOR AN AIRCRAFT FUSELAGE

[75] Inventor: Ernst H. Hirschel, Zorneding, Fed. Rep. of Germany

[73] Assignee: Messerschmitt-Boelkow-Blohm Gesellschaft mit beschraenkter Haftung, Munich, Fed. Rep. of Germany

[21] Appl. No.: 886,792

[22] Filed: Jul. 16, 1986

[30] Foreign Application Priority Data

Jul. 24, 1985 [DE] Fed. Rep. of Germany ....... 3526472

[51] Int. Cl.$^4$ .............................................. B64C 1/00
[52] U.S. Cl. ................................................... 244/119
[58] Field of Search ............................ 244/119, 13, 15

[56] References Cited

U.S. PATENT DOCUMENTS 3,023,860  3/1962  Ellzey ................................. 244/119
3,955,781  5/1976  Tupolev et al. .

FOREIGN PATENT DOCUMENTS 674433  3/1939  Fed. Rep. of Germany .
1114301  4/1956  France ................................ 244/119

Primary Examiner—Galen Barefoot
Attorney, Agent, or Firm—W. G. Fasse; D. H. Kane, Jr.

[57] ABSTRACT

The tail end structure of an aircraft has a cross-sectional configuration with laterally and downwardly extending lobes reaching outside a circular cross-section tail end structure, yet staying within the silhouette of the circular cross-section tail end structure as viewed from the top, the side, and the bottom, whereby the boundary layer formation and the boundary layer separation are improved as compared to a tail end structure having the circular cross-section.

18 Claims, 14 Drawing Figures

——— FLOW LINE FREE OF FRICTION
-------- BOUNDARY WALL FLOW LINE

TAIL END STRUCTURE FOR AN AIRCRAFT FUSELAGE

FIELD OF THE INVENTION

The invention relates to a tail end structure for the fuselage of an aircraft having a raised cross-sectional configuration deviating from a circular cross-section.

DESCRIPTION OF THE PRIOR ART

Tail end structures of this type are known, for example, from German Pat. No. 674,433 (Schroeder) and from U.S. Pat. No. 3,955,781 (Tupolev et al). It is also known to provide the tail end structure with a circular cross-section as, for example, in the well known airbus.

German Pat. No. 674,433 discloses a fuselage configuration having a somewhat oval upper cross-sectional configuration and a flattened lower cross-sectional configuration. The fuselage itself is made of corrugated metal which is surrounded by a fabric or webbing secured to the ridges formed by the corrugations and covering the valleys between the ridges. A particular tail end construction is not disclosed in German Pat. No. 674,433.

U.S. Pat. No. 3,955,781 (Tupolev et al) discloses a delta winged aircraft with a fuselage having two portions. Each portion forms part of a circular cross-section, whereby the upper portion has a smaller radius and the lower portion has a substantially larger radius so as to flatten the bottom of the fuselage. A specific tail end construction is not disclosed in Tupolev et al. There is room for improvement with regard to the tail end construction, especially with regard to providing better flow conditions for the air flow along the tail end structure.

OBJECTS OF THE INVENTION

In view of the foregoing it is the aim of the invention to achieve the following objects singly or in combination:

to construct the tail end of an aircraft or spacecraft fuselage in such a manner that improved conditions are provided for the boundary layer formation, especially along the tail end underside and for the boundary layer separation;

to construct the tail end in such a way that drag is reduced as compared to the prior art, especially in comparison with tail end structures having circular cross-sections; and to modify the cross-sectional area of the tail end structure without modifying its silhouette as viewed from the side, from the top, and from the bottom as compared to the silhouette of a conventional tail end structure having a circular cross-section.

SUMMARY OF THE INVENTION

According to the invention there is provided a tail end structure for the fuselage of an aircraft or spacecraft having cross-sections with a centroid displaced downwardly relative to the centroid of a circular cross-section. This downward displacement of the cross-sectional centroid is achieved by downwardly and laterally extending lobes which are so sized that the lower, upper, and lateral boundary or silhouette contours remain unchanged within the silhouette of a tail end structure having a circular cross-section.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
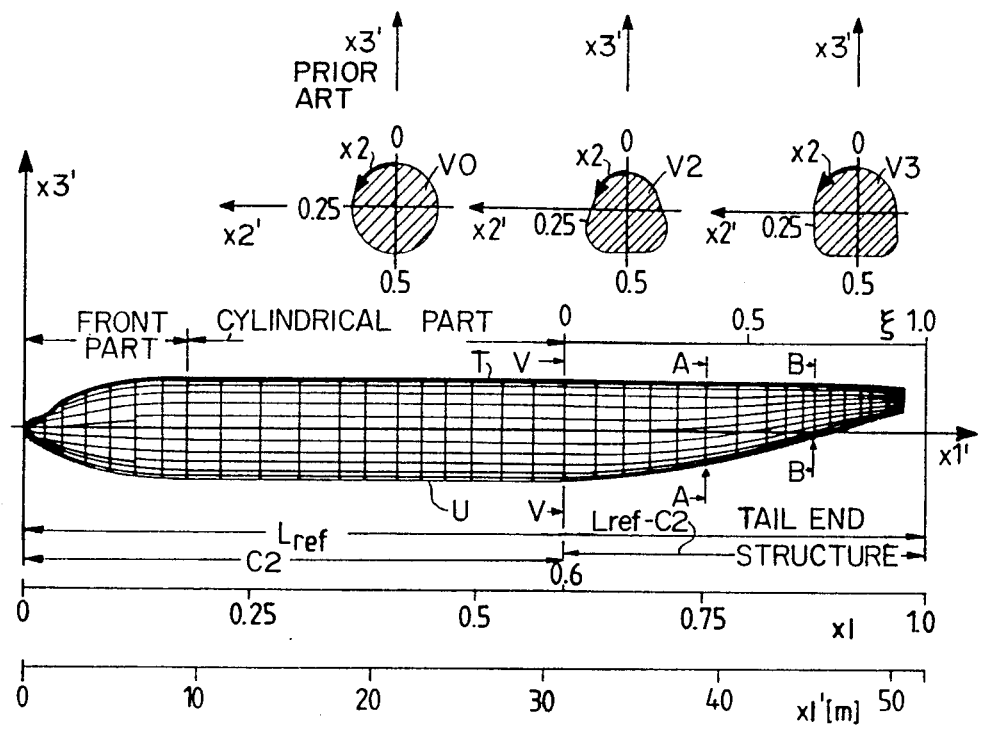
FIG. 1 is a schematic, symbolic illustration of the silhouette of an aircraft fuselage including the tail end structure located in a rectangular coordinate system, whereby the three sectional views are taken along section plane A—A, but through three different tail end structures to illustrate a conventional circular cross-section and two cross-sections through tail end structures according to the invention.

FIG. 1 illustrates symbolically an aircraft fuselage in a rectangular coordinate system wherein the ordinate is x3' and the abscissa is x1'. The ordinate and abscissa are indicated in meters. A relative scale x1 indicates the total length Lref=1 of the fuselage. The length of the front part and of the cylindrical part of the fuselage together is indicated by C2. The circular cross-section V0 shown in FIG. 1 relates to a conventional tail end structure having this circular cross-section throughout its length Lref−C2. The tail end structures of the invention V2 and V3 do not have such a circular cross-section. However, the circular cross-section is used as a reference plane for comparing the cross-sections V2 and V3 according to the invention with the prior art V0.

FIG. 1 further shows a relative scale $\xi$ ranging from zero to 1. $\xi$ is zero at the interface V—V where the tail section merges into the cylindrical part of the fuselage. $\xi$ is one at the very end of the tail structure. The factor $\xi$ represents the degree of deformation of the tail end structure according to the invention and is related to the x1' coordinate as follows:

$$\xi = C1(x1' - C2),$$

wherein C2 is as defined above, and C1=1/(Lref−C2).

Figure 2:
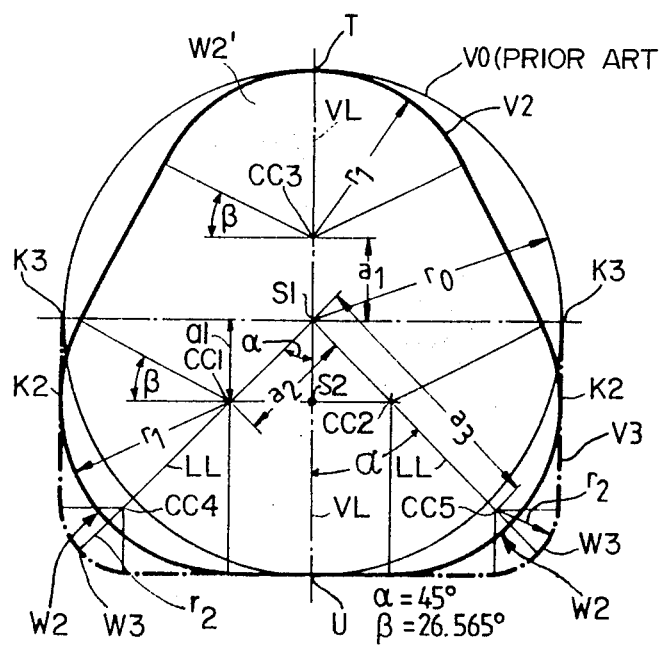
FIG. 2 is also a view against the section plane A—A, but on an enlarged scale as compared to FIG. 1, and illustrating in a superposed view the relationship between the circular conventional cross-sectional configuration (V0) and the modified cross-sectional configurations (V2, V3) according to the invention.
Figure 2A:
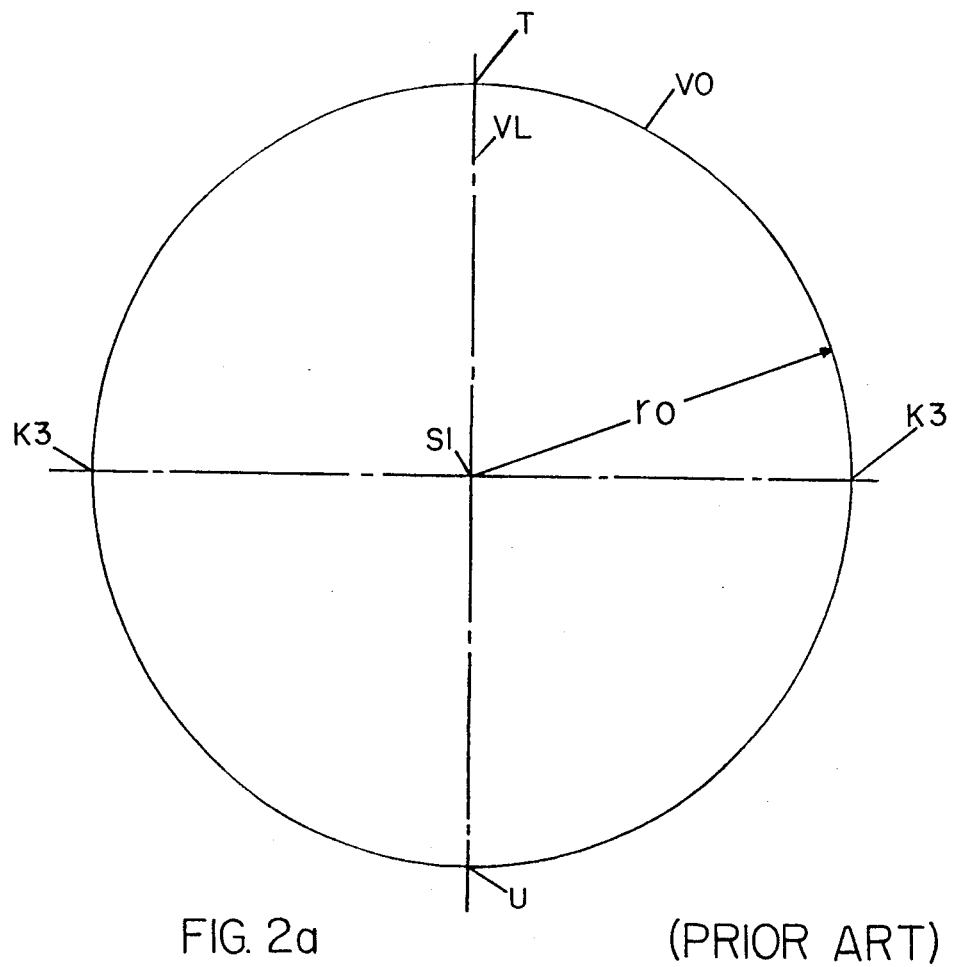
FIG. 2a shows the circular cross-sectional configuration (V0) of a conventional tail end structure providing a reference plane for defining the invention.

FIGS. 2, 2a, 2b, and 2c show a schematic cross-section of the tail end structures V2 and V3 according to the invention against the backdrop of the circular conventional cross-section V0 forming a reference plane separately shown in FIG. 2a. It may be assumed that the section of FIG. 2 is taken, for example, in the plane $\xi = 0.65$. The contour or silhouette boundaries for the conventional circular cross-section are provided by the top boundary line T, by the lateral boundary lines K3, and by the bottom boundary line U. Thus, in the plane of FIG. 1, the silhouette or contour of the conventional circular cross-section is the same as viewed from all four directions. The cross-sections V2 and V3 according to the invention deviate from the circular cross-section as shown, however, in such a way, that the tail end structures according to the invention remain within the contour or silhouette of the circular tail end structure V0. This is so even though the tail end structure V2 has lateral boundary lines K2 which are vertically aligned below the lateral boundary lines K3. The circular cross-section of the conventional tail end structure V0 has a first centroid or surface center of gravity S1 located at the center of the circular cross-section having the radius ro. According to the invention the cross-sectional surfaces of the embodiments V2 and V3 have a second centroid S2 located below the first centroid S1 by a spacing a1 that will depend on the particular cross-sectional surface involved. Both centroids S1 and S2 are located on a central vertical line VL.

Figure 2B:
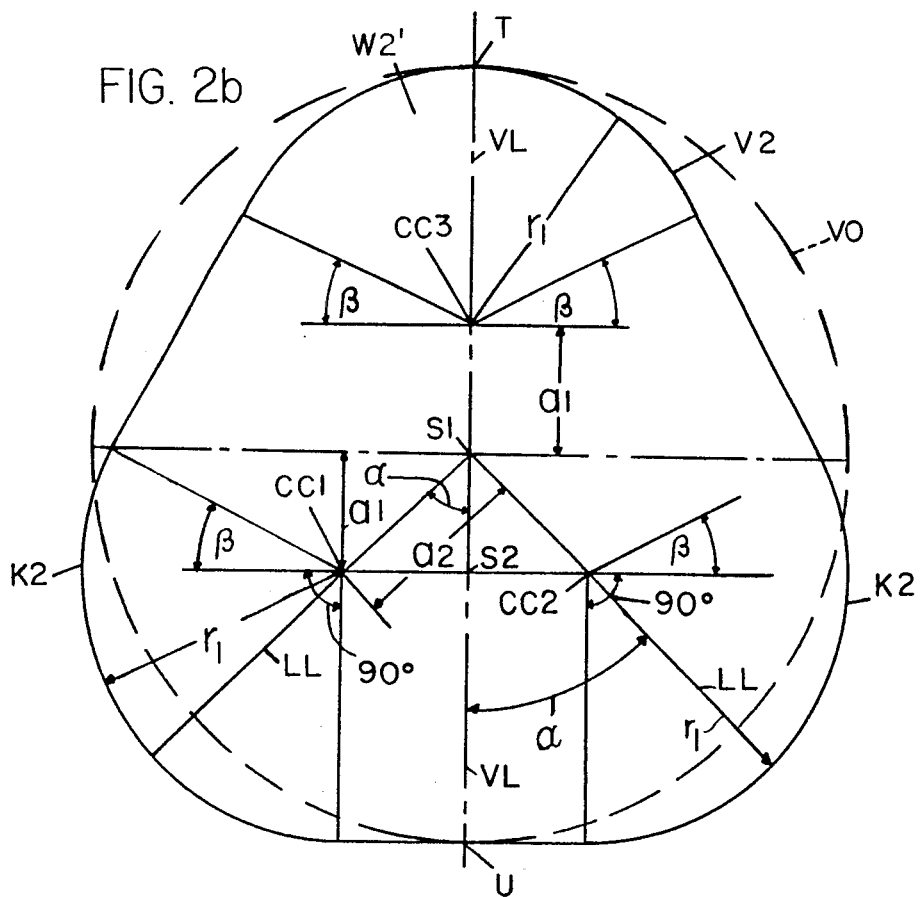
FIG. 2b is a cross-sectional view of a tail end structure (V2) according to the invention.

The cross-section V2 separately shown in FIG. 2b, according to the invention, has two laterally and downwardly extending first lobes W2 and an upwardly and centrally located lobe W2'. The first lobes W2 are mirror-symmetrically arranged relative to the vertical line or plane VL. All the lobes W2 and W2' have the same radius r1 of curvature having a length as given below. Each lobe W2 and W2' has a different center of curvature CC1, CC2, and CC3. The centers of curvature CC1 and CC2 are located on their respective lobe line LL passing through the first centroid S1 and extending at an angle $\alpha$ of, for example, 45° relative to the vertical line VL. The angle $\alpha$ is within the range of 35° to 55° preferably within the range of 40° to 50°. Additionally, the centers CC1 and CC2 are spaced from the first centroid S1 by a spacing a2. The center of curvature CC3 for the upper central lobe W2' is located on the vertical line VL vertically above the first centroid S1 and spaced from the first centroid S1 by the above mentioned spacing a1. The angular extent of the upper lobe W2' corresponds to $180° - 2 \times \beta$ as shown, whereby $\beta$ corresponds, for example, to 26.565°, however $\beta$ may be within the range of 20° to 30°. The angular extent of the two lower lobes W2 corresponds to $90° + \beta$ as shown, whereby the 90° are measured between a vertical line extending through the respective center of curvature CC1 or CC2 in parallel to the central vertical line VL, and a horizontal line extending through both centers of curvature CC1 and CC2, as well as through the second centroid S2. The angle $\beta$ is measured against this horizontal line as shown.

Figure 2C:
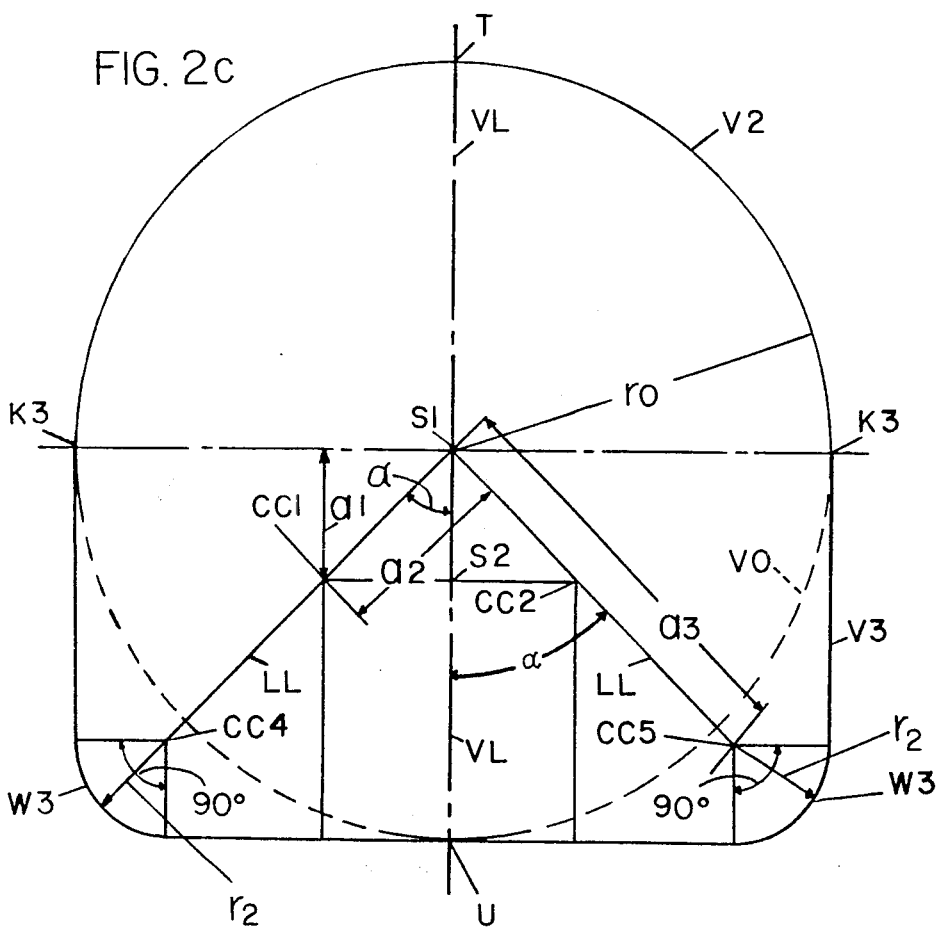
FIG. 2c is another cross-sectional view of a tail end structure (V3) according to the invention.

The second embodiment V3 separately shown in FIG. 2c, according to the invention, has an upper portion forming a semi-circle coinciding with the upper part of the circular cross-section V0 of the prior art. However, the lower portion of the cross-section V3 has two laterally and downwardly extending lobes W3 with a radius of curvature r3 having its origin in respective curvature centers CC4 and CC5 located on the above mentioned lobe lines LL and spaced from the first centroid S1 by the spacing a3. The angular extent of the lobes W3 is approximately 90° as shown.

The cross-sections blend smoothly from the circular shape at $\xi = 0$ into shapes like V2 or V3 (FIGS. 2b and 2c) at the end of the fuselage $\xi = 1$ (for the relations of r1, r2, r3, a1, a2, and a3, see below).

Figure 3:
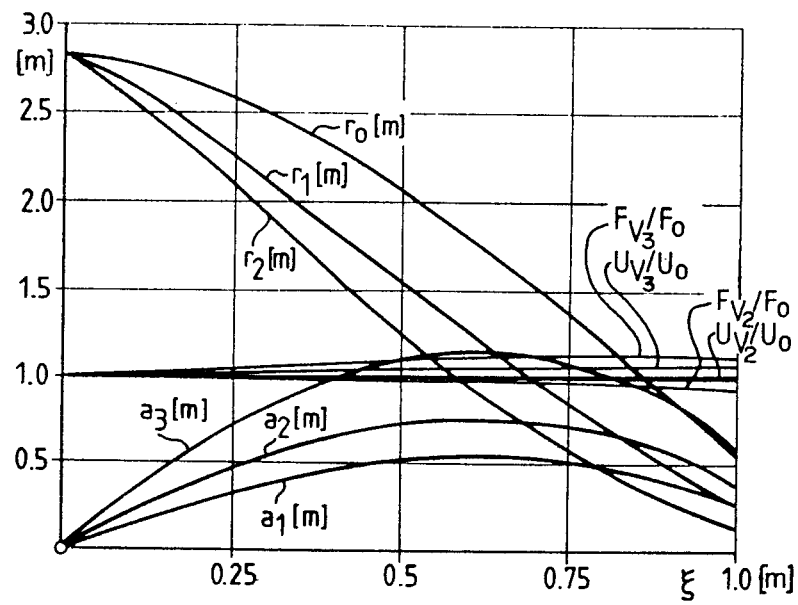
FIG. 3 is a diagram showing the relationship of the curvature radii, of the centers of curvature spacings, of the circumference ratios, as well as the area ratios, all shown as a function of a tail end deformation factor $\xi$ which is a dimensionless number ranging from zero, at the interface between the tail end structure and the fuselage, to one at the tail end.

FIG. 3 shows the dimensional relationship of the above mentioned distances a1, a2, and a3 in meters as a function of the tail end deformation factor $\xi$. FIG. 3 further shows the dimensional relationship of the above mentioned radii ro, r1, and r2 also as a function of the deformation factor in meters or fractions thereof. FIG. 3 shows the surface ratios $(F_{V2}/Fo)$ and $(F_{V3}/Fo)$ and the circumferential ratios $(U_{V2}/Uo)$ and $(U_{V3}/Uo)$ of the cross-sections V2 and V3 according to the invention compared to the surface Fo and the circumference Uo of the conventional circular cross-section. The respective conventional ratios are equal to one. The present ratios become larger than one toward the tail end, except that the surface ratio $(F_{V2}/Fo)$ becomes slightly less than 1 toward the very tail end where $\xi = 1$.

According to the invention, the following empirical relationships are established between the circle radius ro and $\xi$ on the one hand, and the distance a1, a2, a3, and r1, r2 on the other hand.

$r1 = ro(1 - \xi/2),$
$r2 = ro(1 - 0.75\xi),$ whereby $r2 = 0.25 \times ro$
for $\xi = 1$ at the tail end;

$a1 = \dfrac{ro}{2} \xi,$ $a2 = \dfrac{ro}{\sqrt{2}} \xi,$

-continued $$a_3 = \sqrt[3]{2\ ro\ \xi}.$$

FIG. 3 illustrates the above relationships. It will also be seen from FIG. 3 that the surface area ratio (F$_{V2}$/Fo) and the circumferential ratio (U$_{V2}$/Uo) of the embodiment V2 according to the invention are quite close to one as mentioned above so that these ratios indicate that the embodiment V2 has substantially the same flow exposed surface area and substantially the same volume in the tail section as the conventional tail section V0. However, the different shape V2 improves the flow conditions. The respective surface ratio (F$_{V3}$/Fo) and the circumferential ratio (U$_{V3}$/Uo) of the embodiment V3 shows that the volume and the flow exposed area are larger than in the conventional cross-section V0, and provides improved flow conditions.

Figure 4:
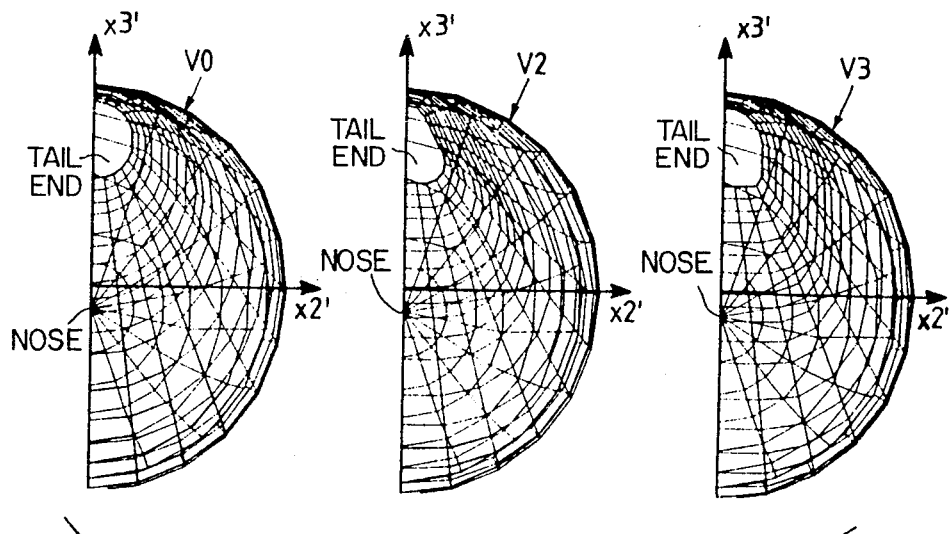
FIG. 4 is a view from right to left in FIG. 1 against the tail end of the fuselage of the aircraft for showing the panel models for the right-hand half of the fuselage for a conventional tail end structure (V0) with a circular cross-section and for two embodiments (V2 and V3) of the invention.

The left-hand part of FIG. 4 illustrates the so-called panel models for the conventional tail section V0. Panel models for the tail sections V2 and V3 according to the invention are shown in the center and at right.

Figure 5A:
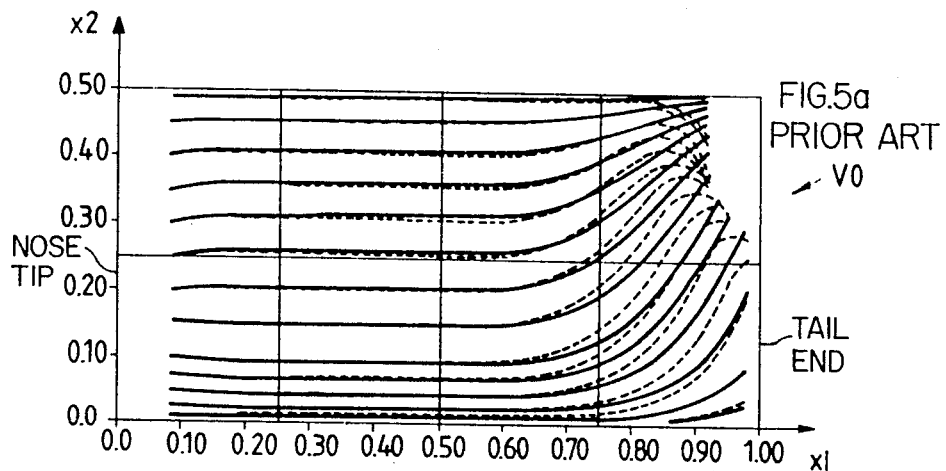
FIG. 5a shows the frictionless flow lines and the boundary wall flow lines for a conventional tail end structure (V0)
Figure 5B:
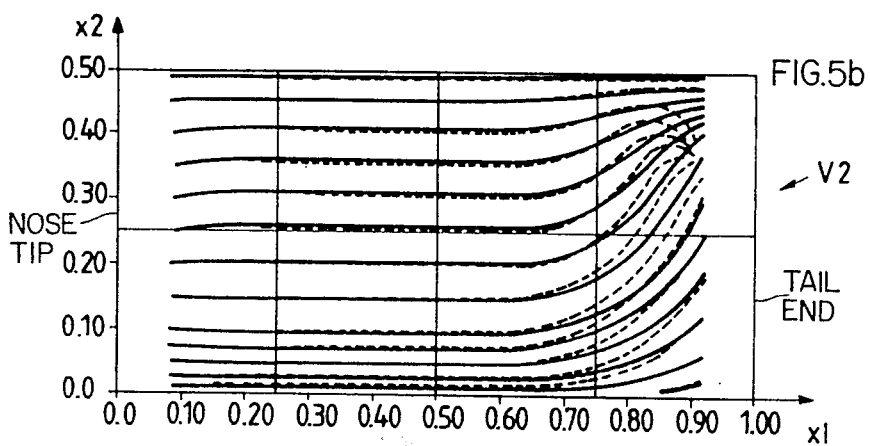
FIGS. 5b and 5c are views similar to that of FIG. 5a, however, showing the frictionless flow lines and the boundary wall flow lines for the embodiments (V2 and V3) according to the invention.
Figure 5C:
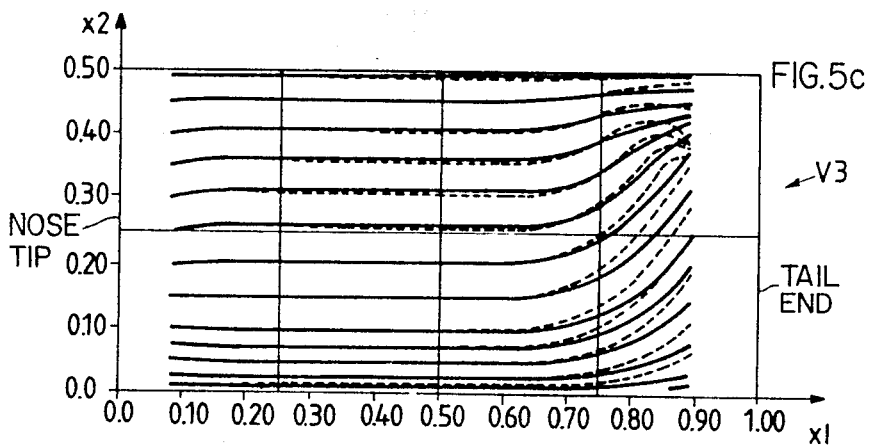

FIG. 5a shows by full lines the computed frictionless flow lines of the prior art tail end structure V0. Dashed lines show the boundary wall flow lines. These lines are drawn in the coordinate plane xa with the x1 and x2, whereby xa is a common reference plane. On the upper side the frictionless flow for the Vo structure is most divergent. FIGS. 5b and 5c show the respective lines for a tail end structure V2 and V3 according to the invention respectively. It is noted that on the upper side of the embodiment V3 the least divergence takes place. The convergence on the other hand is the least on the lower side of the embodiment V2. However, for the boundary layer characteristic, a bend in the flow lines is controlling. This bend is signified for the prior art tail end V0 by a strong convergence of all the boundary wall flow lines on the lower or rather underside of the fuselage. On the other hand, the boundary wall flow lines for the embodiment V2 and V3 extend substantially in parallel to the underside of the fuselage and in FIG. 5c these boundary wall flow lines even have a somewhat convergent tendency, please see the upper right-hand corner of FIG. 5c.

These features of the embodiments V2 and V3 result in improved boundary layer characteristics including a substantially reduced drag and hence an improved efficiency with regard to speed and fuel consumption.

Figure 6:
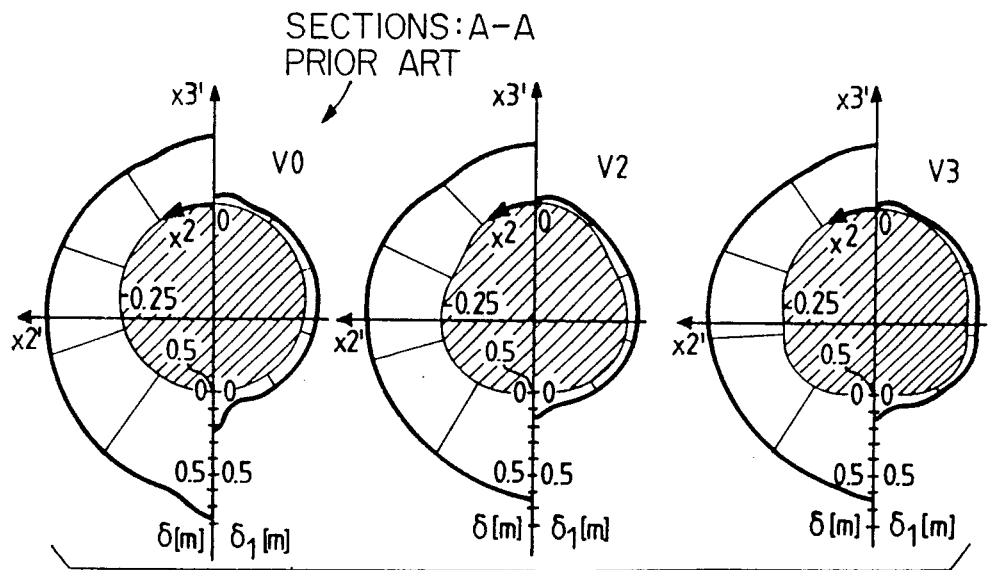
FIG. 6 illustrates sectional views in section line A—A at $x1=0.75$ in FIG. 1, showing on the left-hand side of each section the boundary layer thickness ($\delta$) and on the right-hand portion of each section the boundary layer displacement thickness ($\delta 1$) of a conventional tail end section (V0) and of the two tail end sections (V2, V3) according to the invention.
Figure 7:
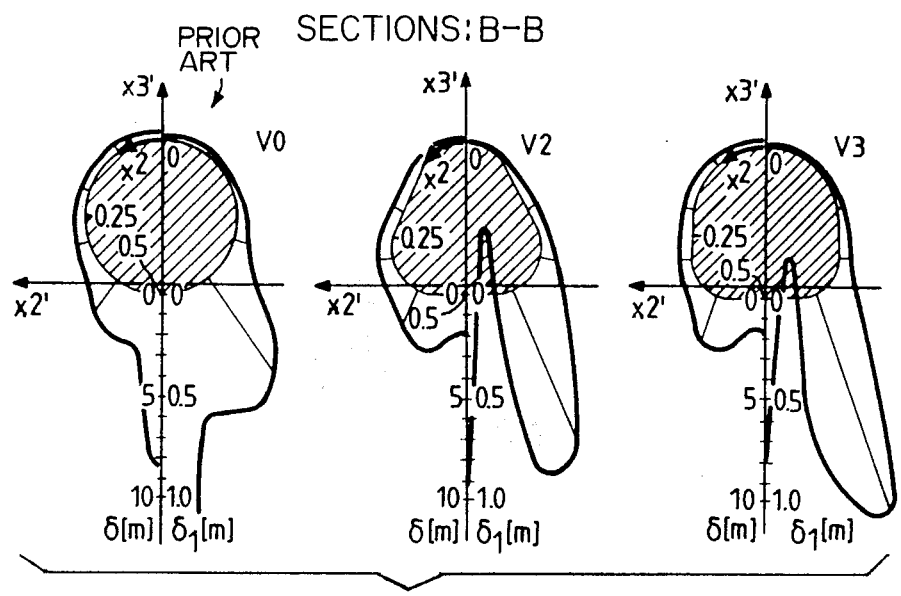
FIG. 7 are views corresponding to those of FIG. 6, however, showing the sections at the section plane B—B at $x1=0.89$ in FIG. 1.

FIGS. 6 and 7 provide further information regarding the boundary layer separation characteristics, whereby FIG. 6 reflects sectional views on the section line A—A in FIG. 1, where x1=0.75 (about), whereas FIG. 7 illustrates views along section plane B—B in FIG. 1, where x1=0.89 (about). In all instances the left-hand part of each illustration shows the boundary layer thickness δ while the right-hand part of each illustration shows the boundary layer displacement thickness δ1. It will be noted that in all instances V0, V2 and V3 in the sectional plane A—A corresponding to x1=0.75 the entire flow is convergent at the lower line of symmetry. As a result, the boundary layer thickness increases toward the tail end on the underside of the fuselage, please see FIG. 6. However, the thickening is less in the embodiments V2 and V3 of the invention. Further, the boundary layer thickness distribution changes substantially at the section plane B—B corresponding to x1=0.89 as shown in FIG. 7. In the illustration for the prior art tail end V0 a substantial thickening takes place while in the embodiments V2 and V3 of the invention merely a small lobe is formed in the boundary layer thickness contour adjacent to the lower plane of symmetry.

FIG. 6 shows that the boundary layer is thicker on the bottom of the tail end section of the fuselage than on its upper side. The ratio of the boundary layer thickness to the boundary layer displacement thickness (δ/δ1) is in the same order of magnitude as the respective ratio of the two-dimensional reference plane also known as the 1/7—power-boundary layer. In the conventional construction V0 the boundary layer at the lower surface of the tail end section, at x1=0.75, is about 10% thicker than in the embodiments V2 and V3 according to the invention. At the lower contour line the boundary layer thickness at the cross-section B—B (x1=0.89) as shown in FIG. 7, goes down from about 8.5 for V0 to about 2 for V2 and V3. At the tail end cross-section located at the leading edge of the elevator assembly there is a lobe in the boundary layer thickness contour in the prior art tail section V0. Such a lobe indicates a possible longitudinal vortex type boundary layer separation. However, toward the lower line of symmetry where x2 is equal to 0.5, the separation changes into a form indicating a two-dimensional separation, possibly a dead-water type of separation. The situation is different in the embodiment V2 and V3 where the boundary layer thickness contour has such a lobe that only one longitudinal vortex type separation is indicated without any separation near the lower line of symmetry.

With regard to the wall shearing stress distributions it is noted that in the prior art structure V0 a substantial drop is noted at the lower symmetry plane, whereas in the embodiment V3 a much smoother configuration is noted.

Figure 8A:
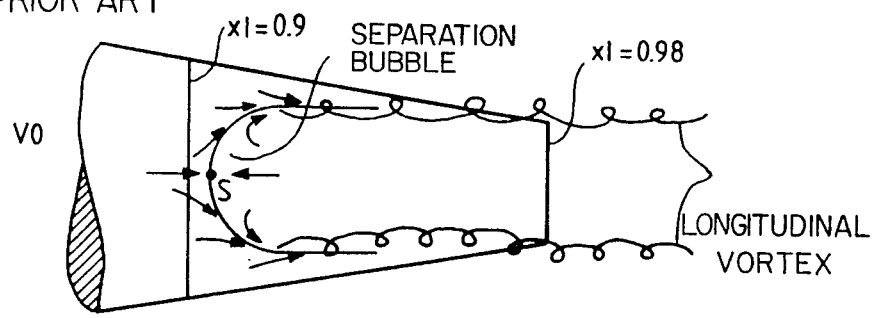
FIG. 8a shows boundary layer separation configurations for a conventional tail section with a circular cross-section.

Regarding the possible boundary layer separation characteristics it is noted that in the prior art structure V0 at x1=0.9, a closed separation bubble is formed which extends along the underside of the tail end section. FIG. 8a shows in this respect the lobe formation of the thickness contour together with the convergence of the boundary wall flow lines providing the possibility of an embedded vortex type longitudinal separation to the left and right of the line of symmetry.

Figure 8B:
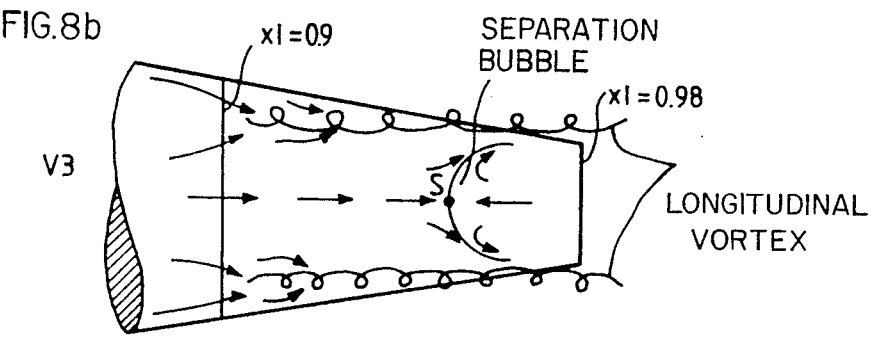
FIG. 8b shows the boundary layer separation configurations of one embodiment (V3) of the tail section according to the invention illustrating the displacement of the separation bubble toward the tail end.

FIG. 8b shows for the embodiment V3 at x1=0.9 a longitudinal vortex type separation alone. The separation bubble is shifted further down toward the end of a tail end section. Stated differently, the boundary layer at the under surface of the structure V2 or V3 is not in danger of separation contrary to the prior art structure V0.

Locating the second centroid S2 below the conventional location at S1 by modifying the cross-sectional configuration to V2 or V3 results in a more advantageous boundary layer characteristic, especially at the lower surface of the tail end section in the embodiments V2 and V3 as compared to the conventional structure V0. Further, the structures V2 and V3 according to the invention are just as simple to manufacture as a tail section having a circular cross-section because the increase in the volume and surface do not pose any problems. The separation characteristics and the drag characteristics are also impoved. The wing and the raised tail end structure guide in the same manner the frictionless flow and thus the boundary layer under the tail end section. Further, the on-flow to the elevator assembly near the fuselage is improved.

LIST OF SYMBOLS

Fo=frame sectional surface of conventional tail section V0 having a circular cross-section.

$F_{V2}$; $F_{V3}$=frame sectional surface of tail sections V2 and V3 according to the invention.

($F_{V2}$/Fo); ($F_{V3}$/Fo)=surface ratios comparing tail section surfaces of the invention with conventional tail section Fo having a circular cross-section.

Uo=circumference of conventional tail section V0 having a circular cross-section.

$U_{V2}$; $U_{V3}$=circumference of tail sections V2 and V3 according to the invention.

($U_{V2}$/Uo); ($U_{V3}$/Uo)=circumferential ratios comparing tail section circumferences of the invention with conventional tail section V0 having a circular cross-section.

K2=lateral contour boundary of embodiment V2.
K3=lateral contour boundary of embodiment V3.
T=upper contour boundary line.
U=lower contour boundary line.
W2=lower lateral lobes (first lobes) of embodiment V2.
W2'=upper central lobe (second lobe) of embodiment V2.
W3=lower lateral lobes (first lobes) of embodiment V3.
V0=cross-section through a conventional cylindrical tail structure providing a reference plane.
V2=cross-section through a first tail end structure according to the invention.
V3=cross-section through a second tail end structure according to the invention.
a1=spacing above first centroid S1 for defining center CC3 of curvature of a first lobe radius r2.
a2=spacing laterally below first centroid S1 for defining centers CC2, CC3 of curvature for first lobe radius r2.
a3=spacing laterally below first centroid S1 for defining centers CC4 and CC5 of curvature for second lobe radius r3.
Lref=length of fuselage from nose tip to the end of the tail section.
C1=(1/Lref−C2).
C2=length of fuselage section including nose portion and cylindrical portion C1+C2=Lref.
ro=radius of circular conventional section V0.
r1=first lobe radius of first tail cross-section V2 of invention, about 0.7×ro.
r2=second lobe radius of second tail cross-section V3 of invention, about 0.25×ro at the tail end for $\xi=1$.
x1=first surface coordinate for sectional plane.
x2=second surface coordinate for sectional plane.
$x_\alpha$=reference plane for x1 or x2.
x1'=rectangular reference coordinates.
x2'=rectangular reference coordinates.
x3'=rectangular reference coordinates, a dimensionless number.
$\xi$=tail end coordinate.
$\delta$=boundary layer thickness.
$\delta_1$=boundary layer displacement thickness.
$\alpha$=lobe line angle, within range of about 35° to 55°.
$\beta$=lobe limit angle, of about 26.565°.
S1=first surface center of gravity or centroid of circular sectional plane V0.
S2=second surface center of gravity or centroid of sectional planes through tail sections V2 and V3 of the invention.

Although the invention has been described with reference to specific example embodiments, it will be appreciated, that it is intended to cover all modifications and equivalents within the scope of the appended claims.

What I claim is:

1. A tail end structure for an aircraft fuselage having a longitudinal central axis extending centrally through said fuselage, comprising a circular sectional reference plane as defined by a circular fuselage and extending through an interface between said circular fuselage and said tail end structure perpendicularly to said longitudinal central axis, said circular reference plane having a first centroid, said tail end structure further comprising a tail cross-section with an upper cross-sectional portion within said circular sectional plane above said first centroid and a lower cross-sectional portion below said first centroid, said lower cross-sectional portion having two first lobes extending laterally and downwardly outside said circular sectional reference plane, said lower cross-sectional portion having a second centroid in said tail cross-section located under said first centroid so that a vertical line passes through both centroids, said tail cross-section having upper, lower and lateral contour or silhouette boundary lines appearing within a silhouette formed by said circular sectional reference plane, so that the projection or silhouette of the tail end structure as viewed from the side and from above or below remains the same as that of a tail end structure having a cross-section corresponding to that of said circular sectional reference plane, whereby said cross-sectional portions of said tail end structure blend smoothly into said circular fuselage.

2. The tail end structure of claim 1, wherein said first and second centroids are located on a central vertical line (VL) passing longitudinally through said central axis and through said first and second centroids.

3. The tail end structure of claim 2, wherein said tail cross-section (V2) has an upper cross-sectional portion with second central upper lobe (W2') having an upper tip (T) coinciding with a point on a circle defining said circular sectional reference plane (V0), said second upper lobe (W2') having a center of curvature (CC3) located on said central vertical line (VL), and wherein said first lobes (W2) extending laterally and downwardly and said second upper lobe (W2') have the same radius (r1) of curvature, said first lobes (W2) having different centers of curvature (CC1; CC2).

4. The tail end structure of claim 3, wherein, in said tail cross-section (V2), said different centers of curvature (CC1; CC2) of said first laterally and downwardly extending lobes (W2) are located on respective radial lobe lines (LL) extending at an angle ($\alpha$) relative to said central vertical line (VL) passing through said first and second centroids, said centers of curvature (CC1; CC2) being spaced from said first centroid (S1) on said respective radial lobe line (LL) by a spacing a2, and wherein said center of curvature (CC3) of said second central upper lobe (W2') is spaced above said first centroid by a spacing a1, said spacings a1 and a2 being proportional to a tail end deformation factor $\xi$, (FIG. 3).

5. The tail end structure of claim 4, wherein said angle ($\alpha$) is within the range of 35° to 55°, preferably within the range of 40° to 50°.

6. The tail end structure of claim 4, wherein, in said tail cross-section (V2), said first laterally and downwardly extending lobes (W2) have an angular limit defined by 90° plus an angle ($\beta$) measured in the respective center of curvature (CC1; CC2), and wherein said second upwardly extending lobe (W2') has an angular limit of 180° minus $2\beta$ measured in the respective center of curvature (CC3) of said upwardly extending lobe (W2').

7. The tail end structure of claim 6, wherein $\beta$ is within the range of 20° to 30°, preferably 26.565°.

8. The tail end structure of claim 3, wherein said center of curvature (CC3) of said second central upper lobe (W2') and said first and second centroids are located on said central vertical line (VL), and wherein said center of curvature (CC3) is spaced above said first centroid (S1) by a distance a1 which corresponds to the vertical spacing between the first and second centroids.

9. The tail end structure of claim 3, wherein said centers of curvature (CC1; CC2) of said first lobes (W2) are located on a common horizontal line also passing through said second centroid (S2).

10. The tail end structure of claim 3, wherein said radius r1 of curvature of said lobes (W2 and W2') corresponds to about: r1$\approx$0.75$\times$ro, wherein ro is the radius of said circular sectional reference plane (V0).

11. The tail end structure of claim 3, wherein said spacing a1 of said center of curvature (CC3) above said first centroid corresponds to about: a1$\approx$0.25$\times$ro, wherein ro is the radius of said circular sectional reference plane (V0).

12. The tail end structure of claim 2, wherein said tail cross-section (V3) has two first lobes (W3) arranged mirror-symmetrically relative to said central vertical line (VL) to form a configuration (V3) having a lobe radius r2 with a center of curvature (CC4; CC5) located on a lobe line (LL) extending downwardly through said first centroid (S1) at a lobe line angle ($\alpha$) relative to said central vertical line (VL) for forming said first lobes (W3).

13. The tail end structure of claim 12, wherein, in said tail cross-section (V3), said lobe radius r2 of said first lobes (W3) satisfies r2=0.25$\times$ro at the tail end where a tail section deformation factor $\xi$ equals 1, wherein ro is the radius of said circular sectional reference plane, and wherein said lobe line angle $\alpha$ is within the range of about 35° to about 55°, preferably 40° to 50°.

14. The tail end structure of claim 12, wherein said upper cross-sectional portion of said tail cross-section (V3) has the shape of a semi-circle coinciding with an upper half of said circular sectional reference plane (V0) having a radius (ro), and wherein said first lobes (W3) extending laterally and downwardly both have the same radius r2 of curvature and different centers of curvature (CC4; CC5).

15. The tail end structure of claim 14, wherein said different centers of curvature (CC4; CC5) of said first laterally and downwardly extending lobes (W3) are located on respective radial lobe lines (LL) extending at said angle ($\alpha$) relative to said central vertical line (VL) passing through said first and second centroids, said centers of curvature (CC4; CC5) being spaced on the respective radial lobe line (LL) from said first centroid (S1) by a spacing a3, and wherein said upper cross-sectional portion having said semicircle has a center of curvature coinciding with said first centroid (S1), said spacing a3 being proportional to a tail end deformation factor $\xi$, (FIG. 3).

16. The tail end structure of claim 15, wherein said first laterally and downwardly extending lobes (W3) have an angular limit of 90° relative to the respective center of curvature (CC4; CC5), and wherein said upper cross-sectional portion has an angular limit of 180° relative to said first centroid (S1).

17. The tail end structure of claim 15, wherein said spacing a3 is a function of said tail end deformation factor $\xi$ as follows:

$$a3 = \tfrac{1}{3}\sqrt{2ro\xi},$$

wherein ro is the radius of said circular sectional reference plane (V0), and wherein $\xi$ is $$\xi = C1(x1' - C2),$$

wherein C1 is the inverse of length of the tail end structure between a cylindrical fuselage section and the tail end, wherein x1' is the rectangular coordinate in the direction of said central axis, wherein C2 is the length of the aircraft fuselage from nose tip to beginning of the tail end structure, and wherein said radius of curvature r2 is a function of said tail end deformation coordinate $\xi$ as follows:

$$r2 = ro(1 - \tfrac{3}{4}\xi),$$

whereby r2=0.25$\times$ro for $\xi$=1.

18. The tail end structure of claim 12, wherein, in said tail cross-section (V3), said first lobes (W3) have a continuous smooth transition for said length (C1) in accordance with said equations for a3 and r2.

* * * * *